US008311678B2

(12) United States Patent
Koehler et al.

(10) Patent No.: US 8,311,678 B2
(45) Date of Patent: Nov. 13, 2012

(54) METHOD FOR ADJUSTING CONCRETE RHEOLOGY BASED UPON NOMINAL DOSE-RESPONSE PROFILE

(75) Inventors: Eric Koehler, Woburn, MA (US); Mark F. Roberts, North Andover, MA (US); Roy J. Cooley, West Chester, OH (US); Steve Verdino, Hamilton, OH (US)

(73) Assignee: Verifi LLC, West Chester, OH (US)

( * ) Notice: Subject to any disclaimer, the term of this patent is extended or adjusted under 35 U.S.C. 154(b) by 212 days.

(21) Appl. No.: 12/821,451

(22) Filed: Jun. 23, 2010

(65) Prior Publication Data
US 2011/0320040 A1 Dec. 29, 2011

(51) Int. Cl.
| | |
|---|---|
| *G05B 21/00* | (2006.01) |
| *G05D 7/00* | (2006.01) |
| *G05D 11/02* | (2006.01) |
| *G05D 11/16* | (2006.01) |
| *G01N 11/00* | (2006.01) |
| *G01N 33/38* | (2006.01) |
| *G01N 11/14* | (2006.01) |
| *B28C 7/04* | (2006.01) |
| *B28C 5/18* | (2006.01) |
| *B01F 15/00* | (2006.01) |

(52) U.S. Cl. ...... 700/265; 700/285; 73/54.03; 73/54.28; 366/8; 366/54; 366/135; 366/142

(58) Field of Classification Search .......... 700/265, 700/285; 73/53.01, 54.01, 54.03, 54.23, 73/54.28, 54.31, 54.38, 54.39; 366/2, 6, 366/8, 16, 17, 1, 14, 15, 27, 30, 33, 34, 36, 366/53, 54, 60, 135, 136, 142

See application file for complete search history.

(56) References Cited

U.S. PATENT DOCUMENTS 4,008,093 A 2/1977 Kitsuda et al.
(Continued)

FOREIGN PATENT DOCUMENTS

EP 0126573 11/1984
(Continued)

OTHER PUBLICATIONS

International Search Report and Written Opinion mailed Aug. 4, 2011 in corresponding PCT patent application No. PCT/US 11/35851.

*Primary Examiner* — Crystal J Barnes-Bullock
(74) *Attorney, Agent, or Firm* — Craig K. Leon; Stephen P. Williams

(57) ABSTRACT

The invention relates to a method for adjusting concrete rheology requiring only that load size and target rheology value be selected initially rather than requiring inputs into and consultation of a lookup table of parameters such as water and hydration levels, mix components, temperature, humidity, aggregate components, and others. Dosage of particular rheology-modifying agent or combination of rheology-modifying agents is calculated based on a percentage of a nominal dose calculated with reference to a nominal dose response ("NDR") curve or profile. The NDR profile is based on a correlation between a rheology value (e.g., slump, slump flow, yield stress) and the rheology-modifying agent(s) dose required to change rheology value by one unit (e.g., slump change from 2 to 3 inches) such that exemplary methods can employ corrective dosing based on the NDR and the measured deviation by the system.

18 Claims, 2 Drawing Sheets

U.S. PATENT DOCUMENTS

| | | | |
|---|---|---|---|
| 4,318,177 A | | 3/1982 | Rapp et al. |
| 4,356,723 A | | 11/1982 | Fay |
| 4,544,275 A | | 10/1985 | Hudelmaier |
| 4,900,154 A | | 2/1990 | Waitzinger et al. |
| 5,114,239 A | * | 5/1992 | Allen ............... 366/6 |
| 5,713,663 A | | 2/1998 | Zandberg et al. |
| 5,752,768 A | | 5/1998 | Assh |
| 5,895,116 A | | 4/1999 | Kreinheder et al. |
| 5,948,970 A | | 9/1999 | Te'eni |
| 6,042,258 A | | 3/2000 | Hines et al. |
| 6,042,259 A | | 3/2000 | Hines et al. |
| 6,224,250 B1 | | 5/2001 | Kreinheder et al. |
| 6,227,039 B1 | | 5/2001 | Te'eni |
| 6,484,079 B2 | | 11/2002 | Buckelew et al. |
| 6,611,755 B1 | | 8/2003 | Coffee et al. |
| 6,997,045 B2 | * | 2/2006 | Wallevik et al. ............ 73/54.28 |
| 7,246,009 B2 | | 7/2007 | Hamblen et al. |
| 7,384,180 B2 | | 6/2008 | Jarvinen et al. |
| 7,386,368 B2 | | 6/2008 | Andersen et al. |
| 7,624,625 B2 | * | 12/2009 | Jau ............... 73/54.31 |
| 8,020,431 B2 | * | 9/2011 | Cooley et al. ............ 73/54.03 |
| 8,118,473 B2 | * | 2/2012 | Compton et al. ............ 366/17 |
| 2002/0015354 A1 | | 2/2002 | Buckelew |
| 2003/0172850 A1 | | 9/2003 | Chun et al. |
| 2005/0138991 A1 | | 6/2005 | Wallevik et al. |
| 2006/0287773 A1 | | 12/2006 | Andersen |
| 2007/0185636 A1 | | 8/2007 | Cooley |
| 2008/0027583 A1 | | 1/2008 | Andersen |
| 2008/0027584 A1 | | 1/2008 | Andersen |
| 2008/0027685 A1 | | 1/2008 | Andersen |
| 2008/0066653 A1 | | 3/2008 | Andersen |
| 2008/0092957 A1 | | 4/2008 | Rosaen |
| 2008/0316856 A1 | | 12/2008 | Cooley |
| 2009/0037026 A1 | | 2/2009 | Sostaric |
| 2009/0158960 A1 | | 6/2009 | Andersen et al. |
| 2009/0171595 A1 | | 7/2009 | Bonilla Benegas |
| 2010/0143696 A1 | | 6/2010 | Bellamy et al. |
| 2011/0029134 A1 | * | 2/2011 | Hazrati et al. ............ 700/265 |
| 2012/0016523 A1 | * | 1/2012 | Koehler et al. ............ 700/265 |

FOREIGN PATENT DOCUMENTS

| | | |
|---|---|---|
| EP | 1961538 | 8/2008 |
| ES | 2281267 | 9/2007 |
| GB | 2144240 | 10/1986 |
| GB | 2392502 | 2/2007 |
| GB | 2426347 | 2/2007 |
| GB | 2432675 | 5/2007 |
| WO | 2007060272 | 5/2007 |
| WO | 2009126138 | 10/2009 |
| WO | 2009144523 | 12/2009 |

* cited by examiner

METHOD FOR ADJUSTING CONCRETE RHEOLOGY BASED UPON NOMINAL DOSE-RESPONSE PROFILE

FIELD OF THE INVENTION

The present invention relates to manufacturing of concrete, and more particularly to a method for adjusting a rheological property of concrete in a ready-mix truck or stationary mixer through incremental doses of a rheology-modifying agent calculated with reference to a nominal dosage response profile.

BACKGROUND OF THE INVENTION

It is known to control the "slump" or fluidity property of concrete in ready-mix delivery trucks by using sensors to monitor the energy required for rotating the mixing drum, such as by monitoring the torque applied to the drum by measuring hydraulic pressure (see e.g., U.S. Pat. No. 4,008, 093, U.S. Pat. No. 5,713,663).

A hydraulic sensor coupled to the hydraulic drive and/or a rotational speed sensor, for example, may be used for monitoring mixing drum rotation. The monitoring of concrete slump involves calibrating the outputs or values obtained from the hydraulic sensor and/or electrical sensor on a mixing truck containing a concrete mix and correlating these with slump values obtained using a standard slump cone test. In the standard slump cone test, a 12-inch truncated cone containing the fresh concrete is removed to permit the concrete to drop, and the vertical height drop of the concrete is measured (e.g. ASTM C143-05). Concrete having this known slump value is added into the drum mixer so that a hydraulic or electrical value, which is obtained as an output from the sensor, can be stored into a memory location and subsequently correlated by computer processing unit (CPU).

During the delivery of the concrete to a customer, the concrete stiffens with time as a result of hydration, evaporation, and other factors, and the sensors detect this as increased hydraulic or electrical energy required for turning the mixing drum. The on-board CPU compares the detected energy value obtained from the sensor or sensors and compares this to values stored in memory. If the sensors and CPU detect that the concrete is beginning to stiffen, the theory is that the CPU can be triggered to activate metering or pumping devices to inject water or other liquid (e.g., chemical dispersant) into the concrete to restore the slump to the desired value.

It has long been desired to obtain the capability to add water or chemical admixture to the concrete in an efficient way, or, in other words, to add the precise quantity of admixture needed to achieve the target rheology value while avoiding dosing errors and lengthy trial and error. The presumption has been that because highly sophisticated sensors and CPU can be used, then an accurate and efficient methodology would inevitably result. However, prior art cement mixing systems, for all of their evolving sophisticated hardware, remain subject to variation in the mixture which they control.

U.S. Pat. No. 5,713,663 of Zandberg et al. declared that slump readings could be monitored in ready-mix trucks by inputting information to an in-line CPU and that such information could include the batch water amount, the amount of particulate material ingredients, sand moisture content, time, "nominated" slump, and other factors (See col. 8, lines 3-14). It was not specifically explained by Zandberg et al., however, which of these factors were to be included or how they were to be weighted. The patent stated that such information could be stored into memory such that the CPU could calculate from the inputted information the required liquid component needed to arrive at a desired slump. It was alternatively explained that the required liquid component could be "pre-calculated" and loaded into the CPU with the other information (Col. 8, lines 15-22). The patent further mentioned that the memory may have stored information "in a look-up table" related to "a range of possible mixes" and thus "for particular mix types and particular slump values and particular amounts of mix ingredients, the system will be able to compare measured values by the sensors against known values for the mix to provide for an adjustment either manually or automatically of the liquid component which is added" (Col. 8, lines 29-36).

Despite reiterating that the objective was to enable "maximization of mixing without an over-supply of liquid component" which otherwise required the concrete mix to be returned rather than delivered, Zandberg et al. did not specify what factors were to be included in the "look-up" table. Nor did they set forth the precise methodology for calculating the dose of the liquid component to be administered.

Similarly, U.S. Pat. Nos. 6,042,258 and 6,042,259 of Hines et al. (MBT Holding/BASF) disclosed an admixture dispensing system for stabilizing the concrete either overnight, same day (as delivery), or for long haul operations. In each of these modes, admixture doses were to be calculated based on "internal charts" located within computer-accessible memory (See e.g., U.S. Pat. No. 6,042,258 at Col. 9, lines 4-30; at Col. 9, lines 42-52; at Col. 10, lines 7-20; and also FIG. 2A at 128, 138, and 148). However, the number of "variables" or conditions required for inclusion on such internal charts or tables appeared to be rather extensive. These variables included the amount of concrete in the mixer, its temperature, the type of cement in the concrete, the amount of time that the concrete is to be in transit in the delivery truck), the amount of water required, and other factors. It was suggested that a batchman or driver may generate his own specific charts or look-up tables depending on the data chosen for entry into the computer, and that the software provider could make adjustments allowing for the driver or batchman "to compensate dosage values for factors not considered in the data charts or look-up tables" (See e.g., U.S. Pat. No. 6,042,258 at col. 9-10; See also U.S. Pat. No. 6,042,259 at col. 9-10). Furthermore, it should be emphasized that the intent of adding admixture was to control cement hydration, rather than slump or other rheology value.

In US Patent Publication 2009/0037026, Sostaric et al. (RS Solutions LLC) disclosed a system for adjusting concrete in ready-mix delivery vehicles using water or chemical additives. This system included sensors for detecting various parameters: such as temperature, pressure, rotation (speed, energy), and tilt/acceleration for calculating slump (See e.g., FIG. 4C; Para. 0071-0072). For example, the system could include sensors for measuring load temperature as well as skin temperature of the mixing drum. The system could also include sensors for measuring "acceleration/deceleration/tilt." The system could even include sensors for measuring vibration and environmental parameters, such as humidity and barometric pressure. (See paragraph 0132). Moreover, the system would automatically add water or other admixtures based upon the measured output of the sensors used by the system.

Despite increased technological sophistication for measuring the ever-increasing number of parameters, as suggested by the increasing number of sensors being deployed for measuring various aspects of the cement during its delivery to a construction site, the present inventors do not believe that the current state of the prior art provides clear guidance about which parameters must be considered and included in lookup tables or which parameters are most important for calculating chemical admixture dosing amounts.

Achieving accurate and efficient dosing of chemical admixtures into concrete is presumed to be difficult in large part due to the fact that the effect of added chemical admixtures on rheology is altered to a greater extent than that of water on rheology by the proportions (e.g. water to cement ratio), characteristics (e.g. cement fineness), and condition (e.g. temperature) of the concrete ingredients and history of the load (age, temperature profile, etc.). These factors are likely to change over the course of different loads of concrete batched over the course of a day, week, month, etc. For instance, the concrete temperature may increase with each batch during the day as the ambient temperature increases. Different deliveries of cement may vary in chemistry and fineness.

Rather than just adjusting slump, it is desired to adjust other rheological properties of the concrete. Rheology deals with the science of the flow and deformation of matter. The rheology of concrete can be defined in terms of slump, slump flow, yield stress, plastic viscosity, apparent viscosity, thixotropy, or flow table test, among other factors. Therefore, it is an object of this invention to select the proper dose of chemical admixture to adjust one or more of such concrete rheology parameters.

In view of the foregoing, the present inventors believe that a novel method for adjusting concrete rheological properties in mixing drums and other mixing devices is needed, a method that is more efficient and practical to use than ones in current practice.

SUMMARY OF THE INVENTION

In surmounting the disadvantages and increasing technical complexity of prior art approaches to the problem of achieving dosing accuracy and avoiding overdosing in concrete mixes, the present invention provides a method wherein the dosing of a particular rheology-modifying agent or combination of rheology-modifying agents is calculated using a nominal dosage response ("NDR") profile, one that surprisingly does not require time-consuming compilations into a lookup table of parameters and hence the inputting of numerous parameters at the outset of each batch preparation or delivery.

A dose response curve relates the dose of a rheology-modifying agent or combination of rheology-modifying agents (such as water, a chemical admixture, or combination thereof) to the rheology, strength, or some other characteristic of the concrete that is modified by the effect of the rheology-modifying agent. The dose response curve may be represented in one of a number of forms, for clarity and convenience, and for ease of CPU programming. For instance, a dose response curve for a chemical admixture that modifies slump can be represented as the dose of chemical admixture as a function of the administered dose to the slump of the concrete. Alternatively, it could be represented as the change in chemical admixture dose needed to change the slump by one incremental unit (for example, admixture dose needed to change slump by one inch).

It is common to establish a dose response curve for a given set of materials under a certain set of conditions, which can be later used to select the proper dose during concrete production. This curve will be referred to herein as the nominal dose response ("NDR") curve. Because the dose response curve is a function of a large number of variables (material properties, temperature, etc.), it would be impractically complex to develop dose response curves considering all relevant variables, program a CPU with look-up tables or the like, measure all relevant variables, and select the correct dose of the rheology-modifying agent (e.g., chemical admixture) to achieve the desired response. It is an object of this invention to provide a means for efficiently and accurately updating the nominal dose response curve to meet changing external variables, without the need to take these variables into account explicitly. Therefore, nominal dose response curves are generated and then adjusted by an adaptive control methodology.

The present invention arises from the surprising discovery that concrete mixes having different parameters (e.g., temperature, mix design, water levels, hydration levels, humidity, different trucks) display "dose response" profiles that vary in amplitude but otherwise have similar behavior in that their dosage response curves do not intersect. The concept of "dose response" as used herein shall mean and refer to the effect of a particular rheology-modifying agent or combination of rheology-modifying agents upon rheology (such as slump, slump flow, or yield stress) as a function of the administered dose.

This unexpected dose response behavior is illustrated in FIG. 1, wherein it is shown that different concrete mixes, into which a rheology-modifying agent such as a polycarboxylate cement dispersant admixture was admixed, show similar dose response curves wherein slump is shown as a function of the dose amount (ounces of admixture per cubic yard of concrete) required to change slump by one unit (such as from 2 to 3 inches slump, and from 3 to 4 inches slump, and so on). The calculation of a nominal dose response ("NDR") profile is basically illustrated in FIG. 2, in which at least two profile curves (labeled "maximum dose" and "minimum dose" for convenient reference) are considered to provide one NDR profile.

The significance of the non-intersecting behavior of the dose response curves (FIG. 1) led the present inventors to the practical realization that one could adjust concrete rheology through use of an NDR profile based on even one curve obtained form only one data set, although using at least two curves is preferred (e.g., FIG. 2) and using a plurality of curves (e.g., FIG. 1) is more preferred from the standpoint of accuracy, the NDR profile can be adjusted by scaling only one parameter—namely, a ratio reflecting the actual admixture performance and that predicted by the nominal dose response curve. Thus, an adaptive control methodology is achieved to update the nominal dose response curve based on actual admixture performance. Each dose of admixture is selected by using the nominal dose response curve adjusted by the scaling factor from previous additions of admixture into the same load of concrete. Thus, the doses selected are adjusted to the actual conditions associated with the concrete load without the need to measure and adjust explicitly for these parameters. In such case, the second and each subsequent doses of admixture within a load are likely to be significantly more accurate than the first dose. This eliminates a lengthy trial-and-error process where previous performance of admixture in the load of concrete is not considered.

It would be further possible to adjust the nominal dose response curve based on admixture performance data from prior loads.

Although the prior art methods have suggested that empirical behavior of the concrete mix could be compensated for by use of water or chemical admixture, until now it has not been taught or suggested how this compensation was to be done. It is the surprising aspect of the present invention that the rheology of the concrete mix can be adjusted by inputting into a computer processor unit (CPU) only the amount of the concrete (load size) and the target rheology value (e.g., slump, slump flow, or yield stress), and comparing the actual rheology to the NDR, adding a percentage of the nominal dose the chemical admixture that would be (theoretically) required to change the actual rheology to the target rheology, measuring the resultant change in rheology value and comparing this to the NDR value that would theoretically have been obtained using the percentage nominal dose, and then adjusting the rheology by adding a subsequent dose which takes into account the deviation measured as a result of the first percentage addition. Hence, the present invention takes into account a "learning" step that is incorporated into the methodology, without having to consider numerous parameters such as temperature, mix design, humidity, and other factors.

Thus, an exemplary method of the present invention for controlling rheology of a hydratable cementitious composition in a mixer wherein the energy required for operating said mixer containing the cementitious composition is measured and correlated with a nominal rheology value and wherein a rheology-modifying agent is added into the cementitious composition to modify its rheology comprises:

(a) entering into a computer processor unit ("CPU") a target rheology value ("TRV") and load size for a hydratable cementitious composition containing or intended to contain a particular rheology-modifying agent or combination of rheology-modifying agents; and (b) obtaining a current rheology value ("CRV") of hydratable cementitious composition contained within a mixer;

(c) comparing through use of CPU the current rheology value obtained in step (b) against a nominal dose response ("NDR") profile stored in CPU-accessible memory and wherein said NDR is based on at least one data set wherein various dose amounts of a particular rheology-modifying agent or combination of rheology-modifying agents and their correlative effect on rheology value (such as slump, slump flow, or yield stress) is retrievably stored, and determining the nominal dose of said particular rheology-modifying agent or combination of rheology-modifying agents required to change the obtained CRV to the TRV specified in step "(a)";

(d) dosing the hydratable cementitious composition in a mixer with a percentage of said particular rheology-modifying agent or combination of rheology-modifying agents that is selected or pre-selected from 5% to 99% based on the nominal dose determined in step (c) required for changing said obtained CRV to said TRV as specified in step (a);

(e) obtaining a subsequent CRV of the hydratable cementitious composition after the percentage of the nominal dose of the particular rheology-modifying agent or combination of rheology-modifying agents selected or preselected in step (d) is added into and uniformly mixed with said hydratable cementitious composition; comparing the dose selected or preselected in step (d) to the dose according to the NDR profile for the same change in the rheology value from step (b) to step (e), and determining the scaling factor ("SF") by which to adjust the dose from the NDR profile, where SF is defined as the actual dose from step (d) divided by the nominal dose to achieve the same change in rheology value indicated by the NDR profile; and (f) mixing into the hydratable cementitious composition the particular rheology-modifying agent or combination of rheology-modifying agents in an amount calculated in terms of SF multiplied by the dose from the NDR profile indicated to convert the current CRV measured in step (e) to the TRV specified in step (a).

If the target rheology value such as slump is not attained upon completion of the aforementioned steps (which can be due to any number of factors, such as temperature or humidity change), then process steps (e) and (f) can be repeated as required. In addition, concrete rheology changes over time.

Each time the rheology value decreases by a certain amount, a rheology-modifying agent (e.g., chemical admixture) must be added to restore the rheology value. Steps (e) through (f) can be repeated to adjust the rheology value.

In preferred methods of the invention, the NDR profiles are calculated based on an average of at least two dose response curve values (see e.g., FIG. 2), and, more preferably, an average of a plurality dose response curve values obtained from trialing the particular rheology-modifying agent or combination of rheology-modifying agents (See e.g., FIG. 3).

In further exemplary embodiments, the system CPU can be programmed to assume a learning mode, whereby batch histories can be incorporated into the NDR profile which is then stored into CPU-accessible memory, and/or the scaling factor can be redefined so that dosing can be rendered more accurate. In other words, the rheology value changes effected by doses of the rheology-modifying agent administered during a concrete mix delivery operation are incorporated into the nominal dose response (NDR) curve or scaling factor whereby the NDR curve or scaling factor (SF) is modified; and rheology value changes in a subsequent concrete mix delivery operation or operations are effected based on the modified NDR curve or modified SF.

Exemplary rheology modifying agents include water, a chemical admixture (e.g., polycarboxylate water reducer, naphthalene sulfonate formaldehyde condensate water reducer, melamine sulfonate formaldehyde condensate water reducer, lignosulfonate water reducer, or hydrocolloid viscosity modifying admixtures such as welan gum or cellulose derivatives), or mixture thereof. Preferred are chemical admixtures such as polycarboxylate cement dispersants, which are commonly used as superplasticizers (or so-called high range water reducers) in the concrete field. So long as the same rheology-modify agent or combination of rheology-modifying agent is being used as was previously trialed for creating the nominal dosage response (NDR) profile, then other variables such as concrete mix design, amount of water or cement or water/cement ratio, aggregate selection or composition, degree of hydration, do not necessarily need to be inputted into the CPU and remain optional. Viscosity modifying admixtures primarily affect the viscosity of the concrete, while having a relatively lesser effect on other properties.

Further advantages and features of the invention may be described hereinafter.

BRIEF DESCRIPTION OF THE DRAWINGS

Further advantages and features of the present invention may be more readily comprehended when the following detailed description of preferred embodiments is taken in conjunction with the appended drawings wherein.

DETAILED DESCRIPTION OF PREFERRED EMBODIMENTS

Figure 1:
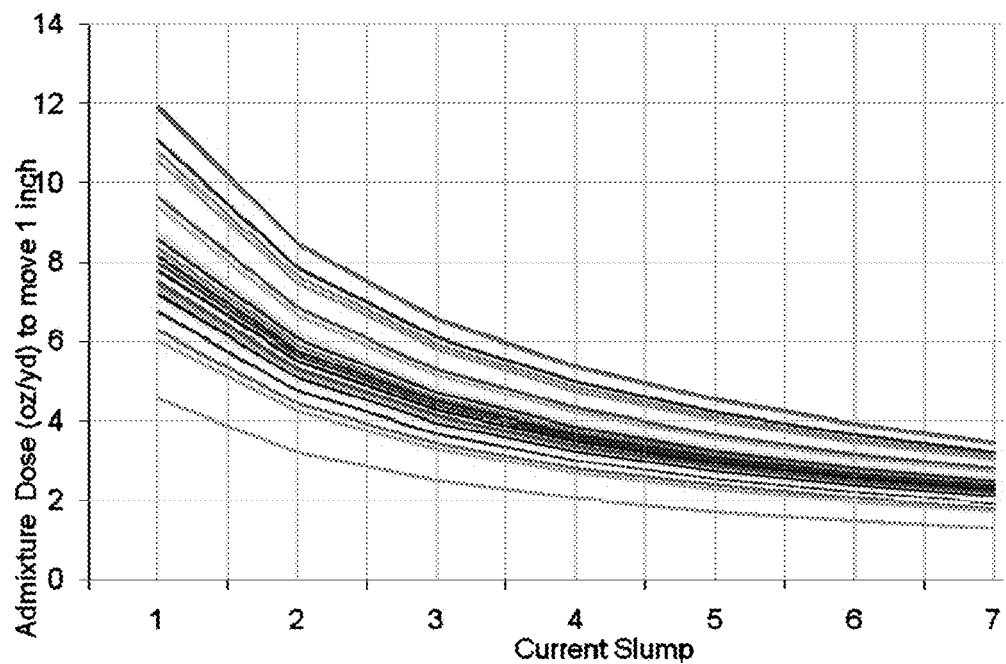
FIG. 1 is a graphic illustration of plurality of dose response curves (profiles) of various concrete mixes, whereby the effect of a particular rheology-modifying agent (e.g., chemical admixture such as polycarboxylate water reducer) is measured upon the slump of the concrete, as shown along the horizontal axis, is measured against the dose of the rheology-modifying agent whose amount, which is measured in terms of ounces per cubic yard required to decrease the slump of the concrete by one unit, as shown along the vertical axis.

The term "cementitious" as used herein refers to a material that comprises portland cement and/or portland cement substitutes that when mixed with water function as a binder to hold together fine aggregates (e.g., sand), coarse aggregates (e.g., crushed stone or gravel), or mixtures thereof.

Cementitious materials considered to be "hydratable" or hydraulic are those which harden by chemical interaction with water.

Such cementitious materials may further include fly ash, granulated blast furnace slag, lime stone, or natural pozzolans, which may be combined with portland cement or be used to replace or substitute for a portion of the portland cement without seriously diminishing hydratable properties. A "mortar" refers to cement or cementitious mixture having a fine aggregate such as sand; while "concrete" refers more accurately to a mortar that also contains a coarse aggregate such as crushed stone or gravel.

The use of the term "cementitious material" may be used interchangeably with the term "concrete," as concrete is most commonly provided by ready-mix trucks which have rotatable mixing drums. The term "concrete" as used herein does not necessarily exclude the fact that the present invention can be used for delivering materials that contain only cement or cement substitutes (e.g., pozzolans) or mortars.

Hydratable cementitious materials, such as concrete mixes, typically contain one or more rheology-modifying agents, which can include water alone or chemical admixtures such as water-reducing agents or high range water-reducing agents called "superplasticizers," viscosity modifying agents, corrosion-inhibitors, shrinkage reducing admixtures, set accelerators, set retarders, air entrainers, air detrainers, pigments, colorants, fibers for plastic shrinkage control or structural reinforcement, and the like.

The phrase "rheology-modifying agent" will therefore be understood to mean and include water, a chemical admixture, or a mixture thereof. In many cases, a chemical admixture formulation will comprise a dispersant and water, for example. The rheology-modifying agent could well comprise one or more cement dispersants (e.g., polycarboxylate water reducer), an air detrainer or combination of detrainers, and other admixtures.

As mentioned in the background section, concrete delivery mixing trucks having slump control monitoring and control equipment, such as hydraulic and/or electric sensors for measuring the energy for turning the mixing drum, speed sensors for measuring the speed of rotation, temperature sensors for monitoring the atmospheric temperature as well as the mix temperature, and dispensing equipment, as well as the computer processing units (CPU) for monitoring signals from the sensors and actuating the dispensing equipment are by now relatively well known in the industry. For example, such slump control systems, which can be used in association with wireless communication systems, are disclosed in U.S. Pat. No. 5,713,663; U.S. Pat. No. 6,484,079; U.S. Ser. No. 09/845,660 (Publication no. 2002/0015354A1); U.S. Ser. No. 10/599,130 (Publication no. 2007/0185636A1); U.S. Ser. No. 11/764,832 (Publication no. 2008/0316856); U.S. Ser. No. 11/834,002 (Publication no. 2009/0037026); and WO 2009/126138. A further exemplary system for monitoring and control using wireless communications in combination with sensors for monitoring various physical properties of the concrete mix is taught in U.S. Pat. No. 6,611,755 of Coffee. These teachings, as well as the patent references as previously discussed in the background section above, are expressly incorporated herein by reference.

Exemplary mixing drums contemplated for use in the present invention may be ones that are customarily mounted for rotation on ready-mix delivery trucks, as mentioned above, or on stationary mixers which may be found in mixing plants. Such mixing drums may have an inner surface upon which at least one mixing blade is attached to the inner surface so that it rotates along with the mixing drum and serves to mix the concrete mix, including the aggregates contained within the mix.

It is believed that a number of exemplary embodiments of the invention may be practiced using commercially available automated concrete mix monitoring equipment with slight modifications as would be apparent in view of the invention disclosed herein. Such mix monitoring equipment is available under the VERIFI® name from Grace Construction Products, Cambridge, Mass., and also from RS Solutions LLC, West Chester, Ohio.

As previously described in the summary above, an exemplary method of the invention for controlling rheology of a hydratable cementitious composition in a mixer wherein the energy required for operating said mixer containing the cementitious composition is measured and correlated with a nominal rheology value and wherein a particular rheology-modifying agent or combination of rheology-modifying agents are added into the cementitious composition to modify its rheology, comprises the following steps:

(a) entering into a computer processor unit ("CPU") a target rheology value ("TRV") and load size for a hydratable cementitious composition containing or intended to contain a particular rheology-modifying agent or combination of rheology-modifying agents; and (b) obtaining a current rheology value ("CRV") of hydratable cementitious composition contained within a mixer;

(c) comparing through use of CPU the current rheology value obtained in step (b) against a nominal dose response ("NDR") profile stored in CPU-accessible memory and wherein said NDR is based on at least one data set wherein various dose amounts of a particular rheology-modifying agent or combination of rheology-modifying agents and their correlative effect on rheology value (such as slump, slump flow, or yield stress) is retrievably stored, and determining the nominal dose of said particular rheology-modifying agent or combination of rheology-modifying agents required to change the obtained CRV to the TRV specified in step "(a)";

(d) dosing the hydratable cementitious composition in a mixer with a percentage of said particular rheology-modifying agent or combination of rheology-modifying agents that is selected or pre-selected from 5% to 99% based on the nominal dose determined in step (c) required for changing said obtained CRV to said TRV as specified in step (a);

(e) obtaining a subsequent CRV of the hydratable cementitious composition after the percentage of the nominal dose of the particular rheology-modifying agent or combination of rheology-modifying agents selected or preselected in step (d) is added into and uniformly mixed with said hydratable cementitious composition; comparing the dose selected or preselected in step (d) to the dose according to the NDR profile for the same change in the rheology value from step (b) to step (e), and determining the scaling factor ("SF") by which to adjust the dose from the NDR profile, where SF is defined as the actual dose from step (d) divided by the nominal dose to achieve the same change in rheology value indicated by the NDR profile; and (f) mixing into the hydratable cementitious composition the particular rheology-modifying agent or combination of rheology-modifying agents in an amount calculated in terms of SF multiplied by the dose from the NDR profile indicated to convert the current CRV measured in step (e) to the TRV specified in step (a).

As described in Step (a), the first step of the exemplary method requires inputting into a computer processor unit ("CPU") only two pieces of information: the target rheology value ("TRV") and the load size for the given hydratable cementitious composition that will be placed into the mixer. The input of these two data points may be performed by the batch master at the ready-mix plant, by the truck driver, or foreman at the construction site. Indeed, this input may be performed by anyone in charge of the concrete delivery and does not require the inputting of other parameters such as temperature, humidity, and other factors which are optional.

The target rheology value (TRV) may be any of the rheology factors whose measurement in unit values are customarily employed, such as: slump (customarily measured in terms of length units, e.g., inches); slump flow (length, e.g., inches); yield stress (customarily measured in terms of stress, e.g., pounds per square inch or pascals); viscosity (pascals·seconds); flow (length); and thixotropy (pascals/second). Load size can be inputted into the CPU in terms of total weight or volume of the batch concrete (e.g., cubic yards) including all of the components. If the TRV is defined in terms of slump, then the measurement for slump can be done in accordance with the following standards: ASTM C 143-05, AASHTO T 119, or EN 12350-2. If the TRV is defined in terms of slump flow, then this measurement can be done in accordance with ASTM C1611-05. If the TRV is defined in terms of the flow table test, then this can be done in accordance with DIN EN 12350-5.

The rheology-modifying agent or combination of rheology-modifying agents mentioned in Step (a) means and refers to water, chemical admixture(s), or mixture thereof which are present in the concrete that is used for generating the data set or sets that provide the nominal dose response ("NDR") profile mentioned in Step (c) as well as in the concrete being adjusted, i.e., whose load size is inputted into the CPU in Step (a) and whose current rheology value (CRV) is obtained in Step (b). It is important for purposes of calibration (i.e., generating the NDR profile) to use the identical or similar rheology-modifying agent(s) for the NDR profile as for dosing into the concrete.

Preferred "chemical admixtures" suitable for use in methods of the present invention include water-reducers and superplasticizers commonly used in the concrete industry. Preferred among these are cement-dispersing polymers which contain (poly)carboxylic acid and/or salt groups and (poly)oxyalkylene groups (herein referred to as "polycarboxylate polymers").

Thus, for example, the "rheology-modifying agent or combination of rheology-modifying agents," as this phrase is employed in Step (a), can refer to one or more active ingredients, such as one or more polycarboxylate polymers, which, in turn, may be used with air entrainers or other admixtures which may have an effect on the rheology of the concrete. The concentration of the one or more active ingredients is very important. One may need to establish and use another nominal dose response (NDR) profile if adding or omitting a particular active ingredient from the chemical admixture(s) formulation. The dispersing polymers will be seen to affect rheology and will be deemed to be "active ingredients" such that it is preferable that the same polymers be used in the NDR profile; this same reasoning applies for other components such as air entraining and/or detraining components if by their amount and/or nature they will have a profound effect on the rheology.

As one of the benefits of the present invention is that it is self-correcting, it may be possible to achieve high accuracy even where the cement-dispersing polymer is different and where other active ingredients might be different in nature and amount. However, when using the method of the present invention, it is preferable to start with the same rheology-modifying agents or same combination of rheology-modifying agents and to compensate for any differences in their concentrations.

In Step (b) of the exemplary method, this second step requires that the system determine the current rheology value ("CRV") of the hydratable cementitious composition contained within the mixer. This is stored in CPU-accessible memory because it will provide a reference point for later steps.

In Step (c) of the exemplary method, the CPU compares the current rheology value (CRV) obtained in Step (b) with the nominal dose response ("NDR") profile stored in CPU-accessible memory. As previously mentioned, this NDR profile is based on at least one data set wherein the effect of various dose amounts of a particular rheology-modifying agent or agents on rheology (e.g., slump, slump flow, yield stress, etc.) is measured. While the method of the invention can work with one data set wherein the effect of the rheology-modifying agent on rheology is correlated, it is preferred to use an NDR profile that is generated using at least two data sets, and it is most preferably to use an NDR profile that is generated using a plurality of data sets.

Figure 2:
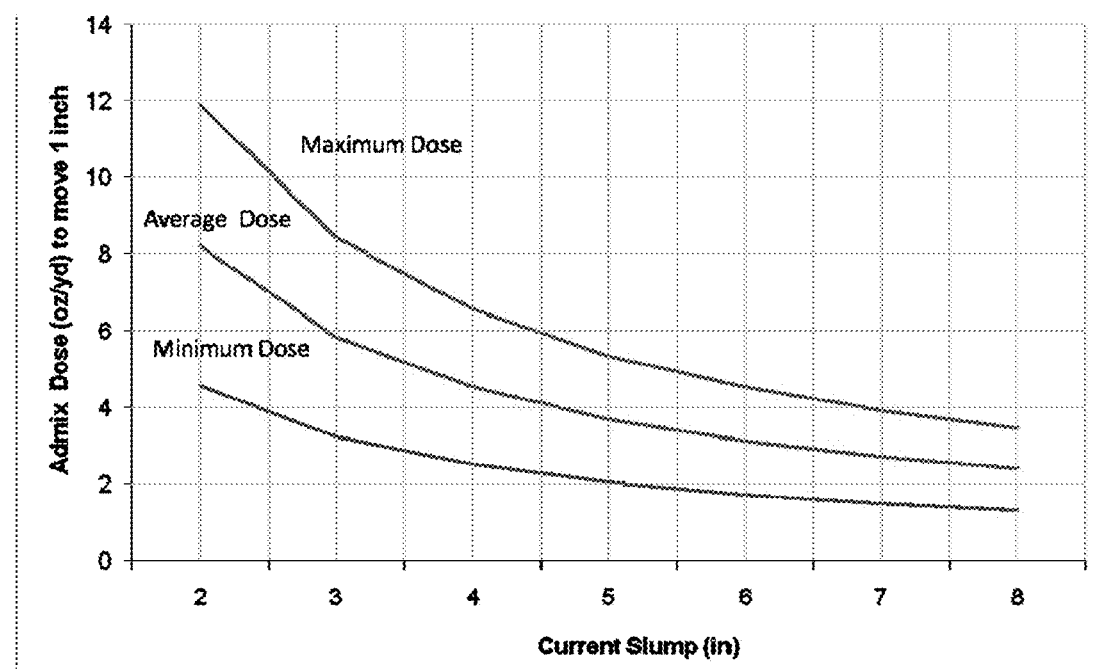
FIG. 2 is another graphic illustration wherein at least two dose response curves (labeled minimum and maximum for the sake of illustration) of a particular rheology-modifying agent are used to calculate an average dose response profile, which may function as a nominal dose response profile used in exemplary methods of the invention for automated control over concrete mix rheology.

For example, FIG. 2 illustrates two dose response curves (labeled minimum and maximum) whereby the slump (inches) of a concrete composition is plotted against the amount of the particular rheology-modifying agent (a slump-modifying concrete admixture) needed for changing slump by one unit (e.g., for changing slump one inch, such as from 2 inches to three inches). The nominal dose response profile (or curve) then is taken as the average of the two dose response curves (minimum and maximum).

As a more preferred example, FIG. 1 illustrates a plurality of dose response curves whose average provides a nominal dose response ("NDR") profile that may be used as a reference during a delivery operation.

In Step (d), the CPU is programmed to dose the hydratable cementitious composition in the mixer using a selected or pre-selected percentage of the ideal amount of the rheology-modifying agent(s) that would be determined by the NDR profile to change the current rheology value (CRV), as determined in Step (b), to the target rheology value (TRV) entered in Step (a). The percentage may be 50% to 95% of the ideal (or nominal) amount, and more preferably would be about 50%-90%; and most preferably would be 50%-80%. Generally, the lower percentage in these ranges is preferable for this first dose until confidence is obtained.

In Step (e), the CPU would be programmed to obtain a subsequent current rheology value (CRV) of the hydratable cementitious composition after the percentage of the nominal dose of the particular rheology-modifying agent (e.g., chemical admixture) administered in Step (d) was added into and uniformly mixed with the hydratable cementitious composition. The CPU would compare the nominal (or theoretical) effect on the rheology value of the percentage dose selected or preselected in step (d) to the subsequent current rheology value (subsequent CRV) and then determine the scaling factor ("SF") by which to adjust the dose from the NDR profile, where SF is defined as the actual dose from step (d) divided by the nominal dose to achieve the same rheology change indicated by the NDR profile.

In Step (f), the CPU would be programmed to mix into the hydratable cementitious composition a subsequent dose of the rheology-modifying agent. The amount of this subsequent dose would be calculated by multiplying the scaling factor (SF) calculated in Step (e) by the amount theoretically needed, according to the nominal dose response (NDR) profile, to change the subsequent current rheology value (CRV) measured in Step (e) to the target rheology value (TRV) specified in Step (a).

Steps (e) and (f) may be repeated whenever the current rheology value (CRV) is less than or greater than the target rheology value (TRV) by a predetermined amount. This may be done automatically, for example, by programming the CPU to repeat this steps when the difference between the CRV and TRV exceeds a predetermined amount. If the difference between the CRV and TRV is less than the predetermined amount, the CPU can be programmed to trigger an alarm to indicate to the operator that the concrete mix is ready to be discharged and poured.

As mentioned above, preferred methods of the invention involve the use of a nominal dose response (NDR) profile which is derived from an average of at least two sets of dose response curves for the particular rheology-modifying agent(s), as illustrated in FIG. 2; and, more preferably, from an average of a plurality of dose response curves for the particular chemical admixture(s), as illustrated in FIG. 1. The dose response curves of FIG. 1 in particular suggests, by the varying curve amplitudes, that various parameters such as concrete mix design, temperature, degree of hydration, water/cement ratio, and aggregate amounts might be varying slightly (or even significantly) from batch to batch. Still, the fact that the various dose response curves did not intersect led the present inventors to realize that these other various parameters did not necessarily need to be kept constant in order to establish a nominal dosage response (NDR) profile because the average of these dose response curves would have similar behavior in terms of calculating amounts of rheology-modifying agent(s) needed for changing the rheology value (e.g., slump) from one value to the next (e.g., from slump of 2 inches to, say, five inches).

Hence, exemplary methods of the invention involve a nominal dose response (NDR) profile involving the use of a plurality of data sets having at least one non-homogeneous parameter. This parameter may, for example, be the concrete mix design, temperature of reaction, degree of cement hydration, the water/cement ratio, and the aggregate amount or cement/aggregate ratio. These may be varied from batch to batch in the data sets which go to make up the NDR profile (See e.g., FIG. 1).

Thus, further exemplary methods of the invention comprise the use of a nominal dose response (NDR) profile that is derived from data sets having at least two non-homogeneous parameters, and even more than two non-homogeneous parameters, such as different concrete mix design, concrete mix ingredient source, temperature, hydration, water/cement ratios, different aggregate amounts or ratios, and concrete mix designs. So long as the particular rheology-modifying agent(s) (e.g., water and/or concrete admixture or combination of chemical admixtures) used for setting up the NDR profile and for obtaining a current rheology value is/are identical or substantially similar, the slope behavior of the dose response curves is similar from one rheology value unit to the next. In fact, even if two rheology-modifying agents vary in composition but are similar in performance, it may be possible to use the same NDR profile for both.

In further exemplary embodiments of the invention, the process of monitoring rheology change can involve the use of more than one type of rheology-modifying agent (or chemical admixture) with each type of rheology-modifying agent having its own scaling factor (SF), nominal dose response profile, or both. For example, one can establish NDR profiles for combinations of chemical admixtures such as: high range water reducer with viscosity modifying admixture; normal range water reducer with high range water reducer; water reducers with set accelerators, set retarders, or combinations thereof; high range water reducers with thixotropy modifying admixtures; and the like.

In still further exemplary embodiments, the method of the invention can be modified so that more than one rheology target can be specified and met within the same concrete mix delivery operation. For example, one may use multiple rheology targets, such as slump target during transit (from batching or plant operation to job site) and during placement (after the truck arrives at the job site where the mix is to be poured). As another example, one may define two rheology targets that the concrete mix must attain within the same delivery operation/process and at the same time, such as slump flow and plastic viscosity. It is possible, in other words, to have one rheology-modifying agent or combination of agents (e.g., admixture packages) for modifying the slump flow (characterized by the spreading of concrete from a removed slump cone) and to have another rheology-modifying agent or combination of agents for modifying the plastic viscosity (characterized by shear stress divided by the shear rate).

In a further exemplary embodiment, the scaling factor is calculated as a weighted average of all dose responses in a given load or mix design. In other words, in a series of delivery operations in which various scaling factors are derived, the scaling factor used in the current delivery operation can be based on an average of all scaling factors computed, but primarily based on data obtained form the most recent delivery operations.

While the invention is described herein using a limited number of embodiments, these specific embodiments are not intended to limit the scope of the invention as otherwise described and claimed herein. Modification and variations from the described embodiments exist. More specifically, the following example is given as a specific illustration of an embodiment of the claimed invention. It should be understood, that the invention is not limited to the specific details set forth in the example. All parts and percentages in the examples, as well as in the remainder of the specification, are by weight unless otherwise specified.

Further, any range of numbers recited in the specification or claims, such as that representing a particular set of properties, units of measure, conditions, physical states or percentages, is intended to literally incorporate expressly herein by reference or otherwise, any number falling within such range, including any subset of numbers within any range so recited. For example, whenever a numerical range with a lower limit, RL, and an upper limit RU, is disclosed, any number R falling within the range is specifically disclosed. In particular, the following numbers R within the range are specifically disclosed: $R=RL+k*(RU-RL)$, where k is a variable ranging from 1% to 100% with a 1% increment, e.g., k is 1%, 2%, 3%, 4%, 5% . . . 50%, 51%, 52%, . . . 95%, 96%, 97%, 98%, 99%, or 100%. Moreover, any numerical range represented by any two values of R, as calculated above, is also specifically disclosed.

Example 1

A concrete mixture was made in a laboratory mixer without any chemical admixtures added. Slump was measured by removing samples and placing them in a slump cone in accordance with ASTM C143-05. When this test was done, the first mixture was discarded. Immediately thereafter, another concrete mixture having the same concrete mix design was made in the same laboratory mixer but this time with a chemical admixture (polycarboxylate water reducer), and slump was again measured using the same standard cone test). When this test was done, the mixture was discarded. A plurality of further successive concrete mixtures of the same concrete mix design and identical mix factors (e.g., temperature, type of cement, amount of air and water, water/cement ratio, etc.) were also made in the laboratory mixer, but each varying only in the dosage amount of the polycarboxylate polymer water reducer. Except for the admixture dose of the water reducer, all other variables were kept constant. Each successive mixture was discarded after slump cone testing.

The data for the above concrete mixes is illustrated as one plotted line shown in FIG. 1.

The above process was repeated, but for each reiteration one of the mix factors was varied while all other mix factors were kept constant. The varied mix factors included: temperature of the materials, the amount and type of cement, type of fine aggregate, type of coarse aggregate, amount of air in concrete, amount of water, and ratio of water to cement.

The data for these concrete mixes having a varied mix factor are also plotted as various lines shown in FIG. 1.

Surprisingly, the inventors discovered that the dosage response curves, as shown in FIG. 1, did not intersect. The present inventors thus discovered that the slump of the concrete mix could be adjusted by reference to the behavior of any curve or an average of all such dosage response curves, and that the behavior of such curve or plurality of curves could serve as a nominal or reference dosage response curve during real time production-operation.

FIG. 2. is a simplified version of FIG. 1 showing "minimum," "maximum," and average dosage response curves. The average dose response curve shown in FIG. 2 can serve as a nominal dosage response curve during real time production-operation.

Example 2

The exemplary method of the invention was tested in the field using a concrete mix truck having an automated monitoring and dosing system provided by RS Solutions LLC of Ohio, commercially available under the trade name VERIFI. This monitoring system could measure slump based on hydraulic pressure and mix drum speed. This system could also inject chemical admixture in liquid form into the mix drum from a small chemical storage tank mounted on the fender. (Reference is also made to US Patent Publication 2009/0037026, Sostaric et al., described in the background section).

Over a period of months a variety of concrete mixes were prepared in the concrete mix truck. Prior to this testing, a nominal dose response profile was obtained, similar to the process described above in Example 1, and this was used as the reference or "nominal" reference dose ("NDR") profile.

A number of tests were run using the exemplary method of the invention for different concrete mix delivery operations, wherein the NDR was used by the computer processing unit of the automated monitoring and dosing system for each successive concrete mix sample prepared in the mix drum. Mixes produced in the drum over the next few weeks experienced natural variations in terms of temperature, raw materials, mixture proportions (e.g., water/cement ratio, water/aggregate ratio, fine/coarse aggregate ratio, etc.).

The amount of water reducing admixture (polycarboxlic acid-based) was dosed in accordance with the method of the invention as described in the foregoing summary section.

Figure 3:
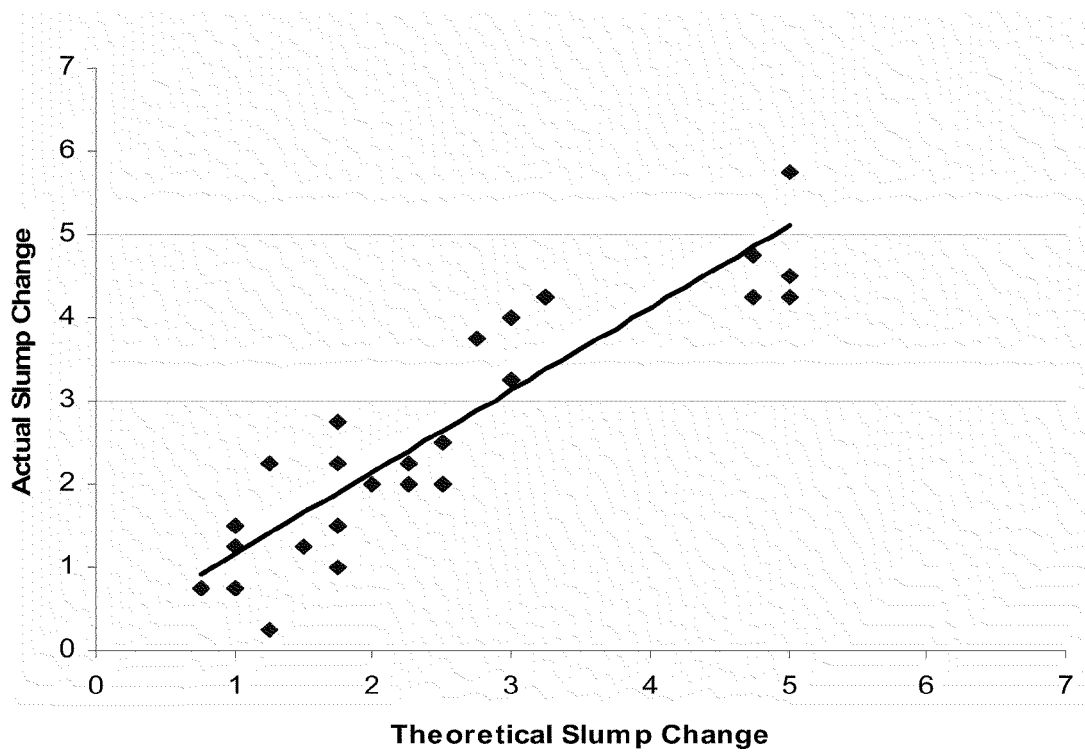
FIG. 3 is a graphic illustration wherein the theoretical (or nominal) slump change is plotted against the actual slump change when exemplary methods of the invention are used.

As shown in FIG. 3, the use of the method resulted in slump changes in the concrete mix that were very close to the predicted changes when the nominal dose response (NDR) curve was used as a reference. See method steps (a) through (f) in Summary section above. When the NDR curve is first applied, the slump change is then used to develop the scaling factor (SF) which is then used on the next addition of admixture. FIG. 3 illustrates that the actual measured slump change values (shown by the dots) closely match the theoretical slump change values.

The principles, preferred embodiments, and modes of operation of the present invention have been described in the foregoing specification. The invention which is intended to be protected herein, however, is not to be construed as limited to the particular forms disclosed, since these are to be regarded as illustrative rather than restrictive. Skilled artisans can make variations and changes without departing from the spirit of the invention.

It is claimed:

1. A method for controlling rheology of a hydratable cementitious composition in a rotatable mixer wherein the energy required for operating said mixer containing the cementitious composition is measured and correlated with a nominal rheology value and wherein a rheology-modifying agent or combination of rheology-modifying agents is added into the cementitious composition to modify its rheology, wherein the improvement comprises:

providing a truck having a rotatable mixer for mixing a hydratable cementitious composition and a computer processor unit ("CPU") for monitoring slump of the hydratable cementitious composition and for controlling dosage of chemical admixture or admixtures into said hydratable cementitious composition contained in said truck rotatable mixer; and (a) entering into said CPU a target rheology value ("TRV") and load size for a hydratable cementitious composition containing or intended to contain a particular rheology-modifying agent or combination of rheology-modifying agents within said truck rotatable mixer; and (b) obtaining a current rheology value ("CRV") of hydratable cementitious composition contained within said truck rotatable mixer;

(c) comparing through use of said CPU the current rheology value obtained in step (b) against a nominal dose response ("NDR") profile stored in CPU-accessible memory and wherein said NDR is based on at least one data set wherein various dose amounts of a particular rheology-modifying agent or combination of rheology-modifying agents and their correlative effect on rheology value is retrievably stored, and determining the nominal dose of said particular rheology-modifying agent or combination of rheology-modifying agents required to change the obtained CRV to the TRV specified in step "(a)";

(d) dosing the hydratable cementitious composition contained in said truck rotatable mixer with a percentage of said particular rheology-modifying agent or combination of rheology-modifying agents that is selected or pre-selected from 5% to 99% based on the nominal dose determined in step (c) required for changing said obtained CRV to said TRV as specified in step (a);

(e) obtaining a subsequent CRV of the hydratable cementitious composition contained in said truck rotatable mixer after the percentage of the nominal dose of the particular rheology-modifying agent or combination of rheology-modifying agents selected or preselected in step (d) is added into and uniformly mixed with said hydratable cementitious composition; comparing the dose selected or preselected in step (d) to the dose according to the NDR profile for the same change in the rheology value from step (b) to step (e), and determining the scaling factor ("SF") by which to adjust the dose from the NDR profile, where SF is defined as the actual dose from step (d) divided by the nominal dose to achieve the same change in rheology value indicated by the NDR profile; and (f) mixing into the hydratable cementitious composition the particular rheology-modifying agent or combination of rheology-modifying agents in an amount calculated in terms of SF multiplied by the dose from the NDR profile indicated to convert the current CRV measured in step (e) to the TRV specified in step (a).

2. The method of claim 1 wherein steps (e) and (f) are repeated whenever the CRV is less than or greater than the TRV by a predetermined amount.

3. The method of claim 1 wherein said NDR profile described in step (c) is derived as an average of at least two sets of dose response curves for the particular rheology-modifying agent or combination of rheology-modifying agents.

4. The method of claim 1 wherein said NDR profile described in step (c) is derived as an average of a plurality of dose response curves for the particular rheology-modifying agent or combination of rheology-modifying agents.

5. The method of claim 4 wherein, in said NDR profile, at least two dose response curves contains at least one non-homogeneous parameter selected from concrete mix design, concrete mix ingredient source, temperature, degree of hydration, water/cement ratio, and aggregate amount.

6. The method of claim 5 wherein, in said NDR profile, at least two dose response curves contains at least two non-homogeneous parameters selected from concrete mix design, concrete mix ingredient source, temperature, degree of hydration, water/cement ratio, and aggregate amount.

7. The method of claim 4 wherein the particular rheology-modifying agent or combination of rheology-modifying agents comprises water, at least one cement dispersant, or mixture thereof.

8. The method of claim 7 wherein said at least one rheology-modifying agent is a cement dispersant.

9. The method of claim 8 wherein said cement dispersant is a lignosulfonate, naphthalene sulfonate, melamine sulfonate, polycarboxylate, or mixture thereof.

10. The method of claim 8 wherein said cement dispersant is a polycarboxylate polymer.

11. The method of claim 1 wherein said rheology value is slump which is correlated with the slump of a standard 12-inch slump cone.

12. The method of claim 1 wherein said rheology value is slump flow.

13. The method of claim 1 wherein said rheology value is yield stress.

14. The method of claim 1 wherein said rheology value is thixotropy.

15. The method of claim 1 wherein said rheology value is plastic viscosity.

16. The method of claim 1 wherein said rheology value is flow table spread.

17. The method of claim 1 wherein rheology value changes effected by doses administered during a concrete mix delivery operation are incorporated into said nominal dose response (NDR) curve or scaling factor whereby said NDR curve or scaling factor (SF) is modified; and subsequent rheology value changes in the same or a subsequent concrete mix delivery operation are effected based on said modified NDR curve or said modified SF.

18. A method for controlling rheology of a hydratable cementitious composition in a rotatable mixer of a concrete delivery truck wherein the energy required for operating said rotatable mixer containing the cementitious composition is measured and correlated with a nominal rheology value and wherein a rheology-modifying agent or combination of rheology-modifying agents is added into the cementitious composition to modify its rheology, wherein the improvement comprises:

(a) entering into a computer processor unit ("CPU") a target rheology value ("TRV") and load size for a hydratable cementitious composition placed into said truck rotatable mixer, said hydratable cementitious composition containing or intended to contain a particular rheology-modifying agent or combination of rheology-modifying agents; and (b) obtaining a current rheology value ("CRV") of hydratable cementitious composition contained within said truck rotatable mixer;

(c) comparing through use of CPU the current rheology value obtained in step (b) against a nominal dose response ("NDR") profile stored in CPU-accessible memory and wherein said NDR is based on at least one data set wherein various dose amounts of a particular rheology-modifying agent or combination of rheology-modifying agents and their correlative effect on rheology value is retrievably stored, and determining the nominal dose of said particular rheology-modifying agent or combination of rheology-modifying agents required to change the obtained CRV to the TRV specified in step "(a)", said NDR profile is an average of a plurality of dose response curves for the particular rheology-modifying agent or combination of rheology-modifying agents, and at least two dose response curves of said plurality of dose response curves contains at least one non-homogeneous parameter selected from concrete mix design, concrete mix ingredient source, temperature, degree of hydration, water/cement ratio, and aggregate amount;

(d) dosing the hydratable cementitious composition in said truck rotatable mixer with a percentage of said particular rheology-modifying agent or combination of rheology-modifying agents that is selected or pre-selected from 5% to 99% based on the nominal dose determined in step (c) required for changing said obtained CRV to said TRV as specified in step (a);

(e) obtaining a subsequent CRV of the hydratable cementitious composition after the percentage of the nominal dose of the particular rheology-modifying agent or combination of rheology-modifying agents selected or preselected in step (d) is added into and uniformly mixed with said hydratable cementitious composition; comparing the dose selected or preselected in step (d) to the dose according to the NDR profile for the same change in the rheology value from step (b) to step (e), and determining the scaling factor ("SF") by which to adjust the dose from the NDR profile, where SF is defined as the actual dose from step (d) divided by the nominal dose to achieve the same change in rheology value indicated by the NDR profile; and (f) mixing into the hydratable cementitious composition the particular rheology-modifying agent or combination of rheology-modifying agents in an amount calculated in terms of SF multiplied by the dose from the NDR profile indicated to convert the current CRV measured in step (e) to the TRV specified in step (a).

* * * * *